Sept. 21, 1971  D. H. EDEN  3,606,697
TRAY FOR SEED GERMINATION AND THE LIKE
Filed Aug. 22, 1969
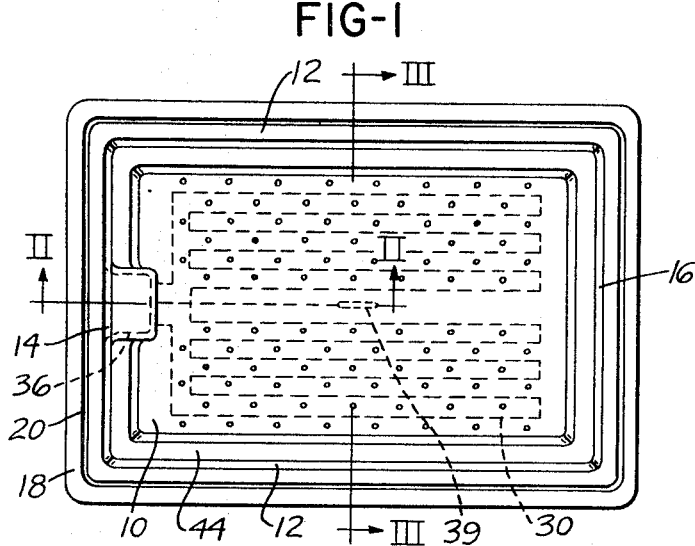
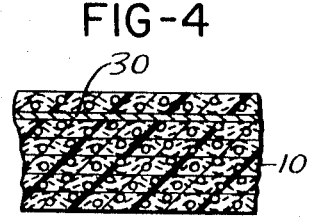
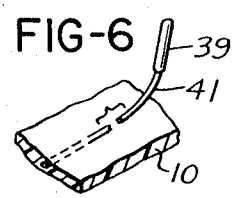
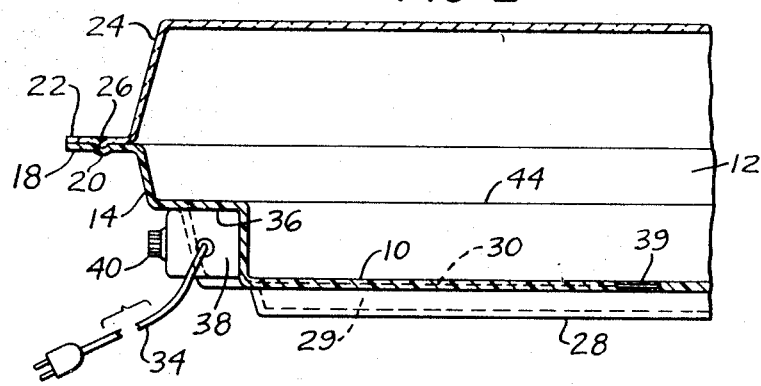
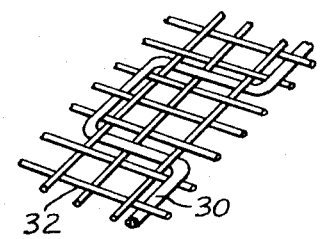
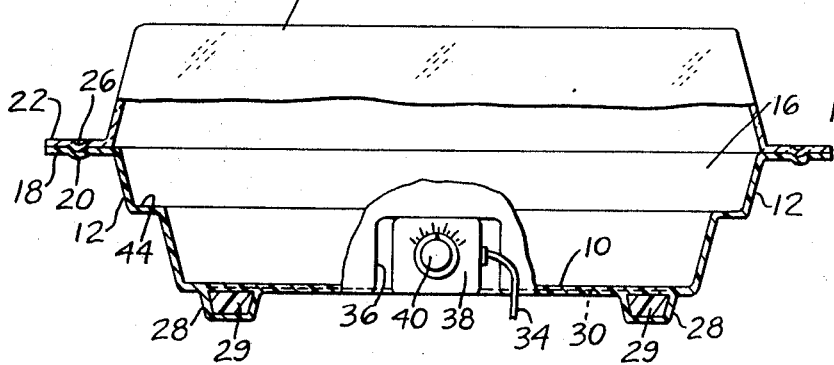
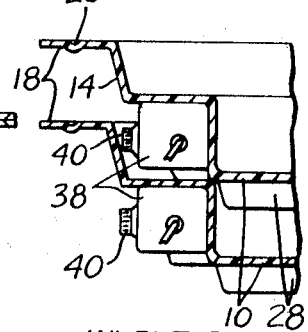
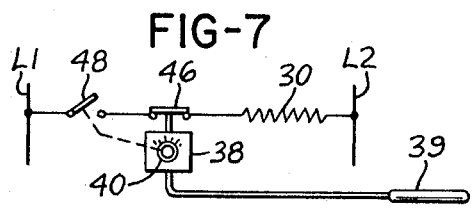
INVENTOR
DOUGLAS H. EDEN United States Patent Office 3,606,697
Patented Sept. 21, 1971

3,606,697
TRAY FOR SEED GERMINATION AND THE LIKE
Douglas H. Eden, Harmony, Pa., assignor to
F. B. Leopold Co., Inc., Zelienople, Pa.
Filed Aug. 22, 1969, Ser. No. 852,159
Int. Cl. A01g 9/24
U.S. Cl. 47—17      6 Claims

ABSTRACT OF THE DISCLOSURE

The invention pertains to a tray for use in connection with seed germination and plant growth and takes the form of a container formed of reinforced polyester resin with an electric heating element embedded in the bottom wall for supplying heat to a medium contained in the tray. Controls for the heating element are mounted in a recess on an end wall of the tray and the side walls of the tray inclined outwardly so the trays can be stacked when not in use.

---

The present invention relates to a container or tray for receiving a medium in which seeds or plants, or spores, can be grown, and is particularly concerned with such a tray which has a heater integral therewith.

The germination of seeds and the growing of spores and plants is a well known and extensive industry and is also carried out on a large scale at the domestic level, particularly for germinating seeds and starting plants in the early spring.

The operation of germinating seeds and causing spores to grow is a matter of obtaining the proper medium, maintaining proper conditions of moisture in the medium and humidity in the ambient atmosphere and, in particular, maintaining the medium at the proper temperature. The conditions referred to can be maintained in greenhouses, and the like, without too much difficulty but are not so easily maintained on a smaller scale.

In either case, the provision of a support and container for the medium can represent a problem, particularly if any mobility of the container is desired.

Having the foregoing in mind, a particular objective of the present invention is the provision of a tray-like container for a growing medium in which closely controlled conditions of temperature and moisture can be maintained in the medium contained therein.

Another object of this invention is the provision of a tray-like device of the nature referred to which has a heating arrangement integrally combined therewith.

A still further object of the present invention is the provision of a tray-like device according to the foregoing object, which also includes integrally therewith a thermostat arrangement for regulating the temperature maintained in the device by the heating means.

A still further object of the present invention is the provision of a tray-like device of the nature referred to in which the material of the device is substantially corrosion resistant and is also able to withstand considerable abuse and is inherently strong against bending and breakage.

It is also an object of the present invention to provide a tray-like device of the nature referred to which can be moved about and which can be stacked with like devices when not in use.

The foregoing objects, as well as other objects and advantages, of the present invention become more apparent upon reference to the following detailed specification taken in connection with the accompanying drawings in which:

FIG. 1 is a plan view looking down on top of a tray-like device constructed according to the present invention;

FIG. 2 is a partial vertical sectional view through one end of the device, drawn at somewhat increased scale, and indicated by line II—II on FIG. 1;

FIG. 3 is a transverse sectional view through the device, drawn at enlarged scale, and indicated by line III—III on FIG. 1;

FIG. 4 is a diagrammatic fragmentary sectional view through the bottom wall of the device, showing the manner in which an electric heating element is embodied in the said lower wall;

FIG. 5 is a perspective view showing the manner in which an electric heating wire can be interwoven with a sheet of textile material prior to incorporation of the material and heating element in the bottom wall of the device;

FIG. 6 is a fragmentary perspective view showing a manner in which a thermostat element could be integrally connected to the bottom wall of the device, while being free for selective placement in the medium in the device;

FIG. 7 is a simplified schematic view showing one manner in which the heating element in the bottom wall of the device could be connected in circuit with a switch under the control of the thermostat; and FIG. 8 is a fragmentary sectional view showing the manner in which the tray-like devices can be stacked when not in use.

BRIEF SUMMARY OF THE INVENTION

The present invention is concerned with a tray-like, or pan-like, device formed of reinforced polyester resin and having embedded in at least one wall thereof an electric heating element for supplying heat to a growing medium contained in the device or container.

One end wall of the device is formed with a recessed portion and mounted therein is a controller for the heating element, which controller is under the control of a thermostat integrally carried by the device, such as by being embedded in a wall thereof, or having a connection leading from the thermostat to the controller and embedded in a wall of the device.

The device, as mentioned, is pan-like, or tray-like, and, to this end, has a flat bottom wall and side walls extending upwardly from the periphery of the bottom wall and inclined outwardly and terminating at their upper edges in a lateral flange. The lateral flange is adapted for receiving a similar flange on the lower edge of a cover member when it is desired to use such a cover member.

The trays can be nested together in stacked relation when not in use and are arranged to prevent the controls thereon from being damaged in any way.

Integral skid elements, formed on the underside of the bottom wall of the tray, support the tray with the bottom wall in spaced relation to a supporting surface and provide a region for receiving the lift fork of a lift truck, or the like. The bottom wall furthermore has holes therein through which excess moisture can be drained from the medium in the tray.

DETAILED DESCRIPTION

Referring to the drawing somewhat more in detail, the tray shown therein will be seen to comprise a flat bottom wall 10, with side walls 12 and end walls 14 and 16 upstanding from the periphery of the bottom wall and inclined outwardly in the upward direction. At the upper edge of the side and end walls there is provided an outwardly extending flange 18, which may be formed with a groove 20. Flange 18 is adapted for receiving flange 22 on a lid member 24, which is in the form of an inverted tray-like member. Flange 22 of lid or cover 24 may have a rib 26 thereon for engaging groove 20 of flange 18, which will serve to locate the lid or cover on the tray and will seal the cover to the tray and also prevent air currents from passing across the top of the tray.

The tray is formed of reinforced polyester resin, preferably by laying up sheets of textile material on a form and coating and impregnating each layer with polyester resin as it is laid up on the form. Such techniques for forming textile reinforced polyester members are known. Members formed in this manner, when cured, are corrosion resistant and are extremely strong physically, as well as being of relatively light weight and comparatively inexpensive. The textile layers referred to can be in the form of woven cloth, or in the form of batting and, in some cases, the textile material is applied to the object being made in the form of relatively long fibers, which are blown on the form either at the same time as the polyester resin is applied thereto, or in the form of layers, which are then coated with polyester resin. In any case, an extremely strong, relatively light weight, inexpensive structure results.

In the case of the present invention, it is preferred to apply the textile material in the form of individual layers to the form on which the device is made.

The tray is provided with longitudinally extending legs, or skids, 28 projecting downwardly from the bottom wall thereof and this can advantageously be accomplished by placing filler members 29 of polyester resin, for example, on the bottom wall of the tray as it is being made and before the last layer, or last two or three layers, of textile mtaerial is placed on the form. By providing for the skids in the manner referred to, the skids become integral with the tray and, in addition to supporting the tray with the bottom wall 10 spaced from a supporting surface, also reinforce the tray against deformation from the loads placed therein.

In one layer of the textile material making up the reinforcing means in the bottom wall 10 of the tray, preferably a woven layer of textile material, there is contained an electric resistance heating element. This heating element is indicated in dashed outline in FIG. 1 by reference numeral 30. As will be seen in FIG. 4, resistant heating element 30 is spaced downwardly from the upper surface of bottom wall 10 and is, thus, completely protected and encapsulated by the polyester material with which the textile reinforcing means of the tray is impregnated and coated.

FIG. 5 shows a typical woven layer of textile-like reinforcing material at 32 and also illustrates one manner in which the resistance heating element 30 might be interwoven therewith. Obviously, the particular manner in which the resistance heating element is interwoven with the textile reinforcing material can be varied and it is not necessary that the heating element following the particular pattern illustrated in FIG. 5.

The resistance heating element is supplied with electrical energy via a supply cable or cord indicated at 34 in FIGS. 2 and 3, and which may advantageously be adapted for being plugged into an outlet for supplying voltage at, say 115 volts to the resistance heating element. The end wall of the tray at one end is provided with a recess 36 and mounted within the recess is a controller 38 that controls the supply of electrical energy from cord 34 to resistance heating element 30. This controller is under the control of a thermostat 39 which may be embedded in the bottom wall 10 of the tray and connected with the controller 38 in any suitable known manner. The controller 38 is preferably is adjustable, as by means of the adjusting knob 40, to establish the desired temperature in the medium contained within the tray.

As will be seen in FIG. 6, the thermostat 39 may be disposed outside the bottom wall 10 of the container. The connecting element 41 leading from the thermostat to the controller may be a flexible element with a substantial portion thereof adjacent thermostat 39 disposed outside wall 10. This arrangement will permit the thermostat to be located in the medium contained in the tray at the most advantageous location therein to control the temperature of the medium.

The bottom wall 10 of the tray is also provided with apertures 42 distributed over the bottom wall of the tray and so located as not to intersect the resistance heating element therein. Such drainage holes are necessary to maintain the proper conditions of moisture and air in the medium carried in the tray.

It will be noted that the top wall of recess 36 is coplanar with a shoulder, or step, 44 formed about the side walls and end walls of the tray. Shoulder 44 is availed of in connection with nesting the trays together when not in use while, furthermore, the side and end walls of the tray are stiffened against deformation due to pressures exerted thereon from the inside.

In connection with the nesting of the trays, FIG. 8 shows how the tray can be stacked in nesting relation when not in use. It will be observed that the controller 38 on each lower tray is protected from damage when the trays are stacked because of its location within the recess 36 provided therefor, and the manner in which the trays are supported on one another when stacked. The location of the controller 38 in its recess 36 also shields the controller against damage when the tray is in use because the controller is substantially completely shielded.

FIG. 7 shows a schematic circuit arrangement for controlling the supply of power to the resistance heating element 30. In FIG. 7, the resistance heating element 30 is shown connected between power lines L1 and L2 through a switch blade 46, which opens and closes under the influence of controller 38 as the said controller is influenced by signals supplied thereto from thermostat 39.

FIG. 7 also shows that the adjusting knob 40 of controller 38 could be connected to operate an on-off switch 48, if so desired, so that in one extreme position of knob 40 the supply of power to heating element 30 would be interrupted.

With respect to the material with which the tray is made, while polyester resin has specifically been referred to, it will be understood that any sort of thermosetting resin be employed for this purpose.

The cover of the tray can advantageously be fabricated to obtain exactly the type of light transmission desired. Thus, the cover could be substantially completely transparent, or it could be fabricated from a translucent material of the desired degree of opacity and, furthermore, could be so fabricated as to pass only certain selected wave lengths of light.

Modifications can be made in the present invention within the scope of the appended claims.

What is claimed is:

1. A tray for germination and growth of seeds and spores and comprising: a pan-like member formed of reinforced resinous material and having a ribbed and perforated bottom wall and also having side walls and adapted to receive a growing medium, an electrical resistance heating element embedded in distributed relation in said bottom wall, a thermostat in said pan-like member, and means for supplying electrical energy to said heating element and including an adjustable current controller connected between a source of electrical energy and said heating element and under the influence of said thermostat, one side wall of said pan-like member having a recess in which said controller is mounted, the side walls of said pan-like member flaring outwardly in the upward direction to permit said pan-like members to be nested together when not in use and a peripheral cover support flange at the upper edge of said side walls, said side walls being formed with an outward step at about the level of the top of the recess in which said controller is mounted, said step forming a stop to limit the telescoping of the pan-like members when nested thereby to protect said controllers.

2. A tray according to claim 1, in which said resinous material comprises polyester resin and the reinforcing thereof comprises multiple layers of textile-like material embedded in said resin and substantially co-extensive with said pan-like member.

3. A tray according to claim 2, in which said heating element is carried by one of said layers of textile-like material.

4. A tray according to claim 1, in which said thermostat is embedded in said bottom wall of said pan-like member.

5. A tray according to claim 1, in which a portion of the connection of said thermostat with said controller is embedded in said bottom wall of said pan-like member while the remainder of said connection is exposed in said pan-like member and is bendable and has the thermostat on the free end thereof whereby said thermostat is moveable inside said pan-like member for positioning in a selected location in the said medium in said pan-like member.

6. A tray according to claim 1, and including a cover member for the pan-like member adapted for resting on said peripheral flange and so fabricated as to transmit light of predetermined wave lengths only therethrough.

References Cited

UNITED STATES PATENTS

| | | | |
|---|---|---|---|
| 2,002,380 | 5/1935 | Wernicke et al. | 47—38 |
| 2,629,042 | 2/1953 | Burleyson | 219—436 |
| 2,834,869 | 5/1958 | Stiebel | 219—441 |
| 2,963,819 | 12/1960 | Hoch | 47—17 |
| 2,971,077 | 2/1961 | Palmer | 219—436 |
| 3,010,006 | 11/1961 | Schwaneke | 219—438X |
| 3,056,232 | 10/1962 | Chaplin | 47—34.13 |
| 3,106,801 | 10/1963 | Risacher | 47—17 |

FOREIGN PATENTS 867,118   5/1961   Great Britain.

ROBERT E. BAGWILL, Primary Examiner

U.S. Cl. X.R.

219—442; 47—19